(12) United States Patent
Kazkaz et al.

(10) Patent No.: US 8,931,430 B2
(45) Date of Patent: Jan. 13, 2015

(54) SPRAY COATING APPLICATOR SYSTEM

(75) Inventors: Ghaffar Kazkaz, Rolling Meadows, IL (US); John P. Wojcik, South Barrington, IL (US); James P. Baltz, Waterville, OH (US); David M. Seitz, Riga, MI (US); Roger T. Cedoz, Curtice, OH (US); Lee A. Sheridan, Barrington, IL (US)

(73) Assignee: Finishing Brands Holdings Inc., Minneapolis, MN (US)

(*) Notice: Subject to any disclaimer, the term of this patent is extended or adjusted under 35 U.S.C. 154(b) by 1529 days.

(21) Appl. No.: 11/911,301

(22) PCT Filed: Apr. 10, 2006

(86) PCT No.: PCT/US2006/013269
§ 371 (c)(1),
(2), (4) Date: Jun. 20, 2008

(87) PCT Pub. No.: WO2006/113201
PCT Pub. Date: Oct. 26, 2006

(65) Prior Publication Data
US 2009/0202731 A1     Aug. 13, 2009

Related U.S. Application Data

(60) Provisional application No. 60/670,920, filed on Apr. 13, 2005.

(51) Int. Cl.
*B05B 13/00* (2006.01)
*B05B 9/047* (2006.01)
(Continued)

(52) U.S. Cl.
CPC ............... *B05B 9/047* (2013.01); *B05B 5/1633* (2013.01); *B05B 5/1625* (2013.01); *B05B 12/149* (2013.01)

USPC .......................................... 118/300; 118/621
(58) Field of Classification Search
CPC ...... B05B 5/1633; B05B 9/047; B05B 5/1625
USPC ........................................................ 118/300
See application file for complete search history.

(56) References Cited

U.S. PATENT DOCUMENTS 2,513,455 A    7/1950   Cornelius
2,738,227 A    3/1956   Havens
(Continued)

FOREIGN PATENT DOCUMENTS

EP    1270087    1/2003
GB    412374     6/1934
(Continued)

OTHER PUBLICATIONS

Canadian Office Action dated Jun. 22, 2011, for Canadian Application No. 2,603,837 (2 pages).

*Primary Examiner* — Dah-Wei D Yuan
*Assistant Examiner* — Stephen Kitt
(74) *Attorney, Agent, or Firm* — Taylor IP, P.C.

(57) ABSTRACT

A spray applicator system is provided with a reservoir manifold assembly having a separate reservoir for each different coating to be applied. Reservoirs are filled from a coating supply system and isolated electrically from the supply system when coating is dispensed from a reservoir to the applicator. Multiple sets of reservoirs can be used, so that an empty reservoir in one set can be filled while coating is dispensed from a reservoir in the other set. The set of reservoirs in which a reservoir is being filled is isolated electrically from the applicator, and of the set of reservoirs in which a reservoir is dispensing coating to the applicator is isolated electrically from the supply system.

12 Claims, 4 Drawing Sheets

(51) Int. Cl.
   *B05B 12/14*       (2006.01)
   *B05B 5/16*        (2006.01)

(56) References Cited

U.S. PATENT DOCUMENTS

| | | | |
|---|---|---|---|
| 3,018,970 A | | 1/1962 | Wittenberg et al. |
| 3,062,153 A | | 11/1962 | Losey |
| 3,225,759 A | | 12/1965 | Drapen et al. |
| 4,403,738 A | | 9/1983 | Kern |
| 4,458,830 A | | 7/1984 | Werding |
| 4,569,378 A | | 2/1986 | Bergandy |
| 4,792,092 A | | 12/1988 | Elberson et al. |
| 4,830,055 A | * | 5/1989 | Kolibas .......... 137/884 |
| 4,854,482 A | | 8/1989 | Bergner |
| 4,932,589 A | * | 6/1990 | Diana ............ 118/302 |
| 5,080,652 A | | 1/1992 | Sancoff et al. |
| 5,137,175 A | | 8/1992 | Kowalski et al. |
| 5,152,455 A | | 10/1992 | Palmers |
| 5,271,569 A | * | 12/1993 | Konieczynski et al. ...... 239/690 |
| 5,288,525 A | | 2/1994 | Diana et al. |
| 5,535,951 A | | 7/1996 | Utter |
| 5,549,755 A | * | 8/1996 | Milovich et al. .......... 118/629 |
| 5,647,542 A | * | 7/1997 | Diana ............ 239/690 |
| 5,667,110 A | | 9/1997 | McCann et al. |
| 5,725,150 A | | 3/1998 | Allen et al. |
| 5,797,520 A | | 8/1998 | Donahue |
| 5,826,805 A | | 10/1998 | Ito et al. |
| 5,882,735 A | | 3/1999 | Takeuchi |
| 6,090,450 A | | 7/2000 | Kahmann et al. |
| 7,000,806 B2 | | 2/2006 | Py et al. |
| 7,156,045 B2 | | 1/2007 | Ueno et al. |
| 8,240,521 B2 | | 8/2012 | Py |
| 2005/0040253 A1 | | 2/2005 | Thornton |
| 2005/0173018 A1 | | 8/2005 | Herre et al. |

FOREIGN PATENT DOCUMENTS

| | | |
|---|---|---|
| JP | 47-36526 | 11/1972 |
| JP | 3013734 B2 | 2/2000 |
| JP | 2002-263556 A | 9/2002 |
| JP | 3453078 B2 | 10/2003 |
| JP | 2004-344738 A | 12/2004 |
| JP | 3786989 B2 | 6/2006 |
| JP | 4002795 B2 | 11/2007 |
| JP | 4462880 B2 | 5/2010 |
| WO | 03095106 | 11/2003 |
| WO | 2006/067983 A1 | 6/2006 |

* cited by examiner

SPRAY COATING APPLICATOR SYSTEM

CROSS-REFERENCE TO RELATED APPLICATIONS

The present non-provisional United States Patent Application claims the benefits of PCT/US2006/013269 filed on Apr. 20, 2006 which claims the benefits of U.S. Provisional Application Ser. No. 60/670,920, filed on, Apr. 13, 2005.

TECHNICAL FIELD

The present invention relates generally to coating applicators and particularly to electrostatic applicator systems adapted for the application of a variety of different coatings in rapid succession. More specifically, the invention relates to so-called "voltage-blocks" used to isolate grounded parts of such systems from other parts of the system that are at high electric potential.

BACKGROUND ART

Automatic spray applicators have wide ranging use for the application of coatings of various types on objects during manufacture. For example, parts for automobile vehicle bodies commonly are coated using robotic devices with spray applicators. The robot is programmed to perform a sequence of maneuvers so that the vehicle body pieces are adequately and precisely covered in a rapid procedure with minimal waste of coating.

Atomizing applicators have been used to reduce the amount of overspray and further reduce waste. In a known atomizing applicator, a bell cup rotates at high speed, and the coating material, such as paint, is provided to the inside of the bell cup. As the paint or other coating moves outwardly and off the bell cup surface as a result of centrifugal force, the coating is atomized into a fine mist and directed at the object to be coated. It is known to direct air streams along the outside of the cup to confine and direct the atomized coating toward the object being coated. It is also known to electrically charge the atomized mist with electrical potential and to ground the object being coated so that the coating material is attracted to the object, further reducing overspray and improving coverage on irregularly shaped target objects.

In present day manufacturing procedures, such as for automobile vehicle bodies, it is common to have parts in random color sequence advancing along the manufacturing line. Thus, for each object to be coated it may be necessary to change the color of paint or the type of coating used from that used for the previous object. Thirty or more different colors may be available to consumers purchasing automobiles, and at any point in the manufacturing process any of the colors may be necessary for coating the object that is placed before the robot. The time required for changing from one coating to another coating should be kept short, so that the painting robot performance does not become a significant limiting factor in the manufacturing speed on the assembly line. In an advantageous system, the time required for changing the coating is no longer than the time necessary to move a completed object from in front of the robot and to move the next target object into position for coating.

With the growing popularity of water based coatings, partly due to environmental concerns and regulations, problems are presented not only in providing rapid changes in coating type, but also in isolating portions of the applicator system that are at high electrical potential from other portions of the system at low electrical potential, in that the coatings are conductive.

It has been proposed to use interchangeable canisters with an applicator that is separated from a station at which the canisters are filled. Various constructions have been proposed for replacing emptied canisters with filled canisters. These systems require not only the aforementioned cleaning of common parts of the applicator system, but also rapid physical exchange of canisters during the change cycle when one object already coated is replaced by the next object to be coated.

DISCLOSURE OF INVENTION

In accordance with various alternative features of the present invention, a spray applicator system is provided with a reservoir manifold assembly having a separate reservoir for each different coating to be applied. The reservoirs are filled from a coating supply system through a color stack device and then isolated electrically from the supply system when coating is dispensed from a reservoir to the applicator. Multiple sets of reservoirs can be used, so that an empty reservoir in one set can be filled while coating is dispensed to the applicator from a reservoir in the other set. When multiple sets of reservoirs are used, the set of reservoirs in which a reservoir is being filled is electrically isolated from the applicator while a reservoir in the other set of reservoir dispenses coating to the applicator. Waste is minimized by using solvent to displace or "push" coating still in the tubes toward the coating destination, either a reservoir during filling or the applicator during spraying.

An advantage of the present invention is providing a spray applicator system in which rapid change of coatings is achieved.

Another advantage of the present invention is minimization of waste by the use of separate reservoirs for each different coating, thereby eliminating the need for cleaning the reservoir after each use.

Yet another advantage of the present invention is providing a coating reservoir manifold and applicator arrangement that is self-contained, having an onboard supply of solvent at high potential for completing application of coating and starting cleaning cycles.

Still another advantage of the present invention is that fluid connections and disconnects of the reservoirs are made by the operation of valves in the fluid circuit, without having to move the reservoirs and attach or detach the reservoirs physically from installed locations.

A further advantage of the present invention is that multiple manifold assemblies can be used to reduce cycle time by dispensing coating from a reservoir in one manifold assembly while simultaneously filling a reservoir in another manifold assembly.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

BEST MODE FOR CARRYING OUT THE INVENTION

Figure 1:
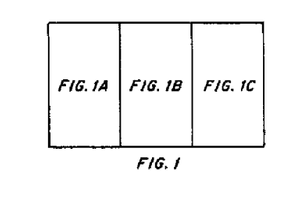
FIG. 1 is a schematic illustration of a coating applicator system in accordance with the present invention.
Figure 1A:
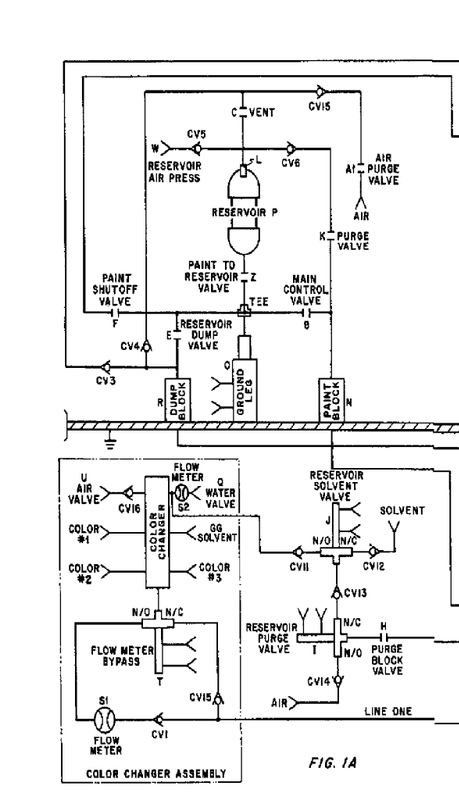
Figure 1B:
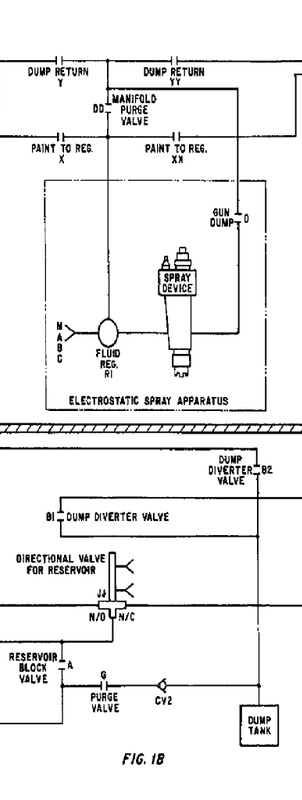
Figure 1C:
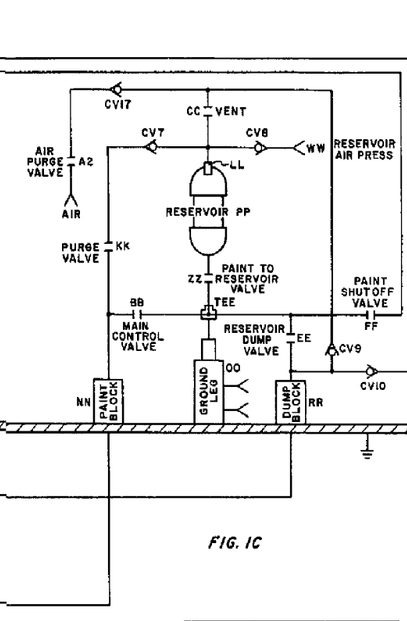

Referring now more specifically to the drawings and to FIG. 1 in particular, a coating applicator system 10 in accordance with the present invention is shown. Applicator system 10 includes an applicator 12, a coatings supply system 14 and a reservoir manifold assembly 16. Reservoir manifold assembly 16 is connected to applicator 12 by a coating feed conduit 18 and to coatings supply system 14 by a supply conduit 20.

Applicator 12 can be of a various types, including sprayer 22 such as a rotary atomizing coating applicator having a rotary bell. The present invention also can be used with other types of applicators, including a gun-type sprayer having a trigger valve 24. Those skilled in the art will understand readily that applicator 12 with sprayer 22 configured as a rotary atomizing sprayer can be mounted on and operated by a robot (not shown) for performing a controlled series of maneuvers to properly and consistently coat a series of objects in a manufacturing process. For example, such applicators 12 can be used to paint automobile body parts. However, the present invention also can be used with applicators 12 for coating a variety of different objects with paint and other coatings. It should be understood that the present invention works well with different styles and types of applicators 12, and for applying different types of coatings, including paints of different kinds, paints of different colors and other types of coatings for different purposes.

Coatings supply system 14 includes a coating kitchen 30 having a supply 32, 34, 36, 38 of each different type of coating to be applied by applicator 12, such as each of the various colors of paint to be applied. In the drawings, applicator system 10 is shown for applying four different coatings from four different coating supplies 32, 34, 36 and 38; however, applicator system 10 can be used for applying virtually any number of different coatings. By way of example, applicator system 10 can be used for painting automobile bodies, which are known to be offered by some manufacturers in thirty or more different colors.

Coatings supply system 14 further includes a coating changer 40 having separate selective connecting valves 42, 44, 46, 48 between supply conduit 20 and each different coating supply 32, 34, 36, 38. Coating changer 40 selectively enables passage of a selected coating from coating supplies 32, 34, 36, 38 to supply conduit 20. Coating changer 40 and supply conduit 20 are cleaned in a manner to be described hereinafter by a changer cleaner system 50 having a selectable solvent connection 52 and a selectable pressurized air connection 54 connected and configured to admit solvent and air respectively to coating passages in coating changer 40 and to supply conduit 20, which is a shared passage for all coatings coming from coatings supply system 14.

Reservoir manifold assembly 16 includes a manifold assembly 60, a solvent system 62 and a dosing fluid system 64. As shown and thus far described, manifold assembly 60 is in flow communication between applicator 12 and coatings supply system 14. To that extent, manifold assembly 60 can be at some intermediate point between applicator 12 and coating supply system 14 or can be close to one of applicator 12 and coating supply system 14 and distant from the other. Location and placement of manifold assembly 60 can be selected as convenient for the size of manifold assembly 60. In an applicator system 10 for coating small objects with a small volume of coating and/or coating objects requiring only a small number of different coatings, manifold assembly 60 can be located on a paint robot including applicator 12. In even smaller applicator systems 10 with fewer different coatings required or smaller volumes of coatings for the objects being coated, manifold assembly 60 can be positioned on a robot arm together with applicator 12. Further, portions of manifold 60 for more frequently used coatings can be located in one area, and portions of manifold 60 for less-frequently used coatings in another area. Generally, it is desirable to shorten the lengths of feed conduit 18 and supply conduit 20 to the extent possible for the application and use of applicator system 10, to minimize coating waste.

Manifold assembly 60 includes a header 70 in selective flow communication between supply conduit 20 and feed conduit 18. In the exemplary embodiment, manifold assembly 60 further includes a separate coating reservoir 72, 74, 76, 78 for each different coating to be received from coating supplies 32, 34, 36, 38 and thereafter applied by applicator 12. Accordingly, in the exemplary embodiment shown, with four coating supplies 32, 34, 36, 38 four reservoirs 72, 74, 76, 78 are illustrated. Manifold assembly 60 further includes an on-board solvent reservoir 80. As will be described more fully hereinafter, header 70 is a shared passage for all coatings supplied from coatings supply system 14 to coating reservoirs 72, 74, 76, 78 and from coating reservoirs 72, 74, 76, 78 to applicator 12. Feed conduit 18 is a shared passage for all coating from header 70 to applicator 12.

Header 70 is a tube or central conduit to which two-way valves 82, 84, 86 and 88 are connected. Accordingly, coating reservoirs 72, 74, 76, 78 are selectably connectable to header 70 by two-way valves 82, 84, 86, 88, respectively. Valves 82, 84, 86, 88 are configured so as to establish fluid flow communication between header 70 and reservoir 72, 74, 76, 78, respectively, allowing the passage of coating into and out of reservoirs 72, 74, 76, 78 from and to header 70.

Reservoirs 72, 74, 76 and 78; valves 82, 84, 86 and 88 and header 70 can be directly connected one with another. Alternatively, tubing sections can be used as necessary between reservoirs 72, 74, 76 and 78 and valves 82, 84, 86 and 88, respectively, and between header 70 and valves 82, 84, 86 and 88. Solvent reservoir 80 is selectably connectable to header 70 by solvent reservoir valves 90 and 92 enabling solvent to flow out of solvent reservoir 80 through a short solvent conduit 94 and into header 70.

Figure 2:
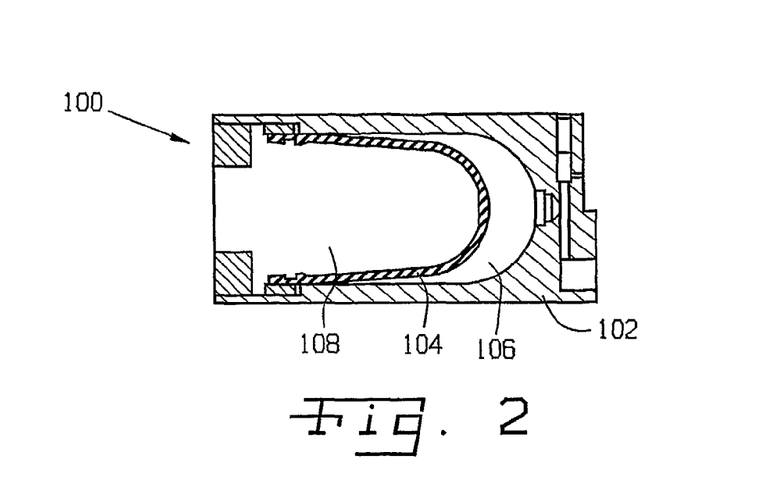
FIG. 2 is a cross-sectional view of an exemplary reservoir used in the manifold assembly of the present invention.

An exemplary embodiment 100 for reservoirs 72, 74, 76, 78 and 80 is shown in FIG. 2 and includes an outer shell 102 and a variable barrier 104 therein. In the exemplary embodiment, variable barrier 104 is a flexible bladder 104 disposed within shell 102. In still other variations, variable barrier 104 can be a membrane, diaphragm, movable wall, or other structure such that shell 102 and variable barrier 104 define a variable first volume 106 and a variable second volume 108. Embodiment 100 is exemplary only, and other reservoir configurations also can be used. Other examples of suitable reservoirs include cylinders with pistons, or cylinders with rolling diaphragms and other mechanically driven barriers, rather than an expandable bladder.

First volume 106 is in selectable flow communication with header 70, via two-way valves 82, 84, 86 and 88 for reservoirs 72, 74, 76 and 78, respectively, and via solvent reservoir valves 90, 92 and solvent conduit 94 for solvent reservoir 80. Second volume 108 in each reservoir 72, 74, 76, 78 and 80 is in flow communication with dosing fluid system 64, as will be described in greater detail hereinafter. In the exemplary embodiment shown, variable second volume 108 is the interior volume of bladder 104.

Solvent system 62 includes a solvent line 110 in selectable flow communication with solvent reservoir 80 via a solvent line valve 112, and via a solvent line valve 114 to a solvent source 116. Solvent suitable for the types of coatings being applied is used. For example, de-ionized water and amine can be used when water-based paints are used as coatings being applied. A pressurized air source 118 is selectably connectable to solvent line 110 via an air valve 120, to admit air to solvent line 110. Solvent system 62 further includes a solvent line 122 that is selectably connectable to header 70 via a header inlet valve 124 and to feed conduit 18 via an applicator inlet valve 126. Solvent line 122 is connectable to solvent source 116 via a solvent line valve 128, and to air pressure source 118 via an air valve 130. It should be understood that solvent source 116 and solvent connection 52 can be connected to a single, same supply of solvent; and pressurized air source 118 and selectable pressurized air connection 54 can be connected to a single, same supply of pressurized air.

A dump line 132 from solvent line valve 112 and solvent line 110 is controllable opened and closed by a dump valve 134 and extends to a dump 136.

Supply conduit 20 is in flow communication with header 70 via a shut-off valve 138 and can be placed in flow communication with solvent line 94 via the aforementioned valves 90 and 92. A second dump line 140 emptying into dump 136 is selectably connected to feed line 20 via valves 142 and 144.

A third dump line 146 from applicator 12 and feed line 18 is controllably opened and closed by a third dump valve 148 and extends to a dump 150, which may be the same or different than dump 136.

Dosing fluid system 64 includes a dosing fluid source 160, a dosing fluid circuit 162 and a dosing fluid pump 164, such as a gear pump. Other pumping means can be used to provide an accurately controllable flow of dosing fluid, so that coating is dispensed accurately from reservoirs 72, 74, 76 and 78. A bypass 166 around pump 164 is provided in dosing fluid circuit 162. Dosing fluid circuit 162 is interconnected between each second volume 108 of each reservoir 72, 74, 76, 78 and 80 in daisy chain fashion, with all second volumes 108 connected in series. It should be understood that second volumes 108 also can be connected in parallel with respect to one another, the configuration of a fluid circuit for which will be apparent to those skilled in the art from the descriptions this far herein and will not be described in further detail. Butyl acetate, liquids with solvated plastic, and other non-conductive fluids can be used as dosing fluid.

Applicator system 10 is used by first filling reservoirs 72, 74, 76, 78 and 80. Coating reservoirs 72, 74, 76 and 78 are filled by opening the appropriate selective connecting valve 42, 44, 46 or 48 from the appropriate coating supply 32, 34, 36 or 38, allowing coating to flow through coating changer 40 and into supply conduit 20. With valves 138 and 144 open, coating flows from supply conduit 20 into header 70. The appropriate two-way valve 82, 84, 86 or 88 is opened and the others are closed, allowing coating to flow into first volume 106 of only the appropriate coating reservoir 72, 74, 76 or 78. As the filling of coating reservoir 72, 74, 76 or 78 nears completion, the opened selective connecting valve 42, 44, 46 or 48 is closed, terminating flow from coating supply 32, 34, 36 or 38. Solvent connection 52 is opened, admitting solvent into coating changer 40, and pushing the remaining coating into header 70. The opened two-way valve 82, 84, 86 or 88 is closed only as the interface between coating and solvent in header 70 nears the opened two-way valve. Thus, very little coating is wasted, and initial cleaning is begun even before reservoir filling is complete. Each reservoir 72, 74, 76 and 78 is filled in the same way, with complete cleaning performed between each fill sequence, as will be described hereinafter.

Solvent reservoir 80 is filled from solvent source 116 via solvent line 110 between solvent valves 112, 114 and solvent reservoir valve 90 being opened. Fill of solvent reservoir 80 can occur simultaneously with the fill of coating reservoirs 72, 74, 76 and 78.

When first volume 106 in any reservoir 72, 74, 76, 78 or 80 is empty of coating or solvent, second volume 108 is filled with dosing fluid, and bladder 104 substantially fills the entire space within shell 102. Accordingly, as coating or solvent flows into first volume 106, first volume 106 increases, bladder 104 is compressed, and dosing fluid is forced out of second volume 108. All second volumes 108 are daisy chained together in a dosing fluid circuit. During the fill of any reservoir 72, 74, 76, 78 or 80, dosing fluid flows through dosing fluid circuit 162 toward dosing fluid source 160, bypassing pump 164 via bypass 166.

Cleaning of supply conduit 20 is completed with continued flow of solvent from solvent connection 52 to completely flush supply conduit 20. Valves 138 and 144 remain open, and valve 92 is opened along with dump valve 134. An initial solvent flush can be followed by alternating bursts of solvent and pressurized air from solvent connection 52 and pressurized air connection 54, respectively, in a so-called solvent/air chop known to those skilled in the art. Solvent/air chops initiate a hammering effect through the various tubes and conduits to dislodge coating material therein and improve cleaning. A final air blow through coating changer 40 and supply conduit 20 removes substantially all traces of solvent, establishing an electrical isolation leg between reservoir manifold assembly 16 and coatings supply system 14. Supply conduit 20, a common or shared passage for all coatings supplied from coatings supply system 14 to reservoir manifold assembly 16, is cleaned between each change in the coatings supply therefrom.

Header 70 is cleaned by opening valves 124 and 128, and flowing solvent into header 70. Valves 92 and 134 are opened so that solvent and residual coating are flushed into dump 136. Pressurized air from pressurized air source 118 is emitted with solvent in a solvent/air chop as described previously. A final air blow without solvent can be performed. As mentioned previously, header 70 is a passageway shared by all coatings supplied to and from reservoirs 72, 74, 76 and 78, and therefore is cleaned between each change in coatings supplied to or from reservoir manifold assembly 16.

When all reservoirs 72, 74, 76, 78 and 80 have been filled, applicator system 10 is ready for performing coating operations. The appropriate two-way valve 82, 84, 86 or 88 is opened so that coating can flow from the appropriate reservoir 72, 74, 76 or 78 into header 70. Dosing fluid pump 164 is activated, pumping dosing fluid along dosing fluid circuit 162. In the reservoir 72, 74, 76 or 78 having an opened two-way valve 82, 84, 86 or 88, dosing fluid fills and expands bladder 104. As second volume 108 increases, first volume 106 is decreased, forcing coating through the opened valve 82, 84, 86 or 88 and into header 70. With applicator inlet valve 126 open, coating flows to applicator 12 for spray application on the object.

As the spray application job nears completion, the opened valve 82, 84, 86 or 88 is closed, terminating flow from the associated reservoir 72, 74, 76 or 78. Solvent reservoir valves 90 and 92 are opened, allowing solvent to flow from solvent reservoir 80 into header 70. Solvent is forced from solvent reservoir 80 under the influence of dosing fluid circuit 162 acting on bladder 104 in solvent reservoir 80. Solvent entering header 70 pushes coating toward applicator 12, thereby minimizing waste and starting initial cleaning even as spray application of coating continues.

It should be noted that as coating first enters header 70 from one or the other of reservoirs 72, 74, 76 or 78, coating will fill header 70, flowing both toward and away from feed conduit 18. Valves 92 and 138 are closed, however, and coating can flow out of header 70 only through feed conduit 18. The solvent push through header 70 after flow from the opened reservoir 72, 74, 76 or 78 is terminated occurs from the end of header 70 opposite the outlet to feed conduit 18. Accordingly, even that small volume of coating that first enters header 70 and flows away from feed conduit 18 is pushed toward applicator 12 during the final moments of the spraying sequence, minimizing coating waste.

When spray application of coating has been completed, pump 164 is stopped and valve 90 is closed. Header 70 is cleaned as described previously. After header 70 is cleaned, the reservoir 72, 74, 76 or 78 that was emptied or partially emptied of coating is again refilled, as described previously.

Applicator 12 is cleaned by opening valves 124, 126, 128 and 130 to allow solvent and/or air to flow from solvent line 122 through feed conduit 18 and applicator 12. Flow through feed conduit 18 can be dumped into dump 150 via third dump line 146 and third dump valve 148. A solvent/air chop as described previously can be used, along with a final air blow. Solvent and or air flowing through applicator 12 can be directed at an appropriate receptacle, as known by those skilled in the art. Cleaning applicator 12 can be performed simultaneously with cleaning of header 70. Applicator 12 and feed conduit 18 are shared passageways for all coatings applied by applicator system 10 and are cleaned whenever a change occurs in the coatings being applied.

In the operating sequence described thus far, all reservoirs 72, 74, 76 and 78 are first filled, and are therefore full and available when an object is to be coated. In an alternate operating sequence, only the reservoir 72, 74, 76 and 78 from which coating will be applied is filled and the remaining reservoirs 72, 74, 76 and 78 are empty. In the alternate operating sequence, all reservoirs 72, 74, 76 and 78 are purged of air, such as by filling with suitable solvent. Reservoirs 72, 74, 76 and 78 are emptied by filling second volume 108 of each with dosing fluid, thereby emptying each first volume 106. In advance of the next object to be coated, the appropriate coating therefore is pumped from coatings supply system 14 to the appropriate reservoir 72, 74, 76 or 78. The coating is applied, and cleaning is performed as described previously. Before the next object is to be coated, the appropriate coating therefore is pumped from coatings supply system 14 to the appropriate reservoir 72, 74, 76 or 78, which may be the same or a different reservoir 72, 74, 76 or 78 from that just emptied previously.

Figure 3:
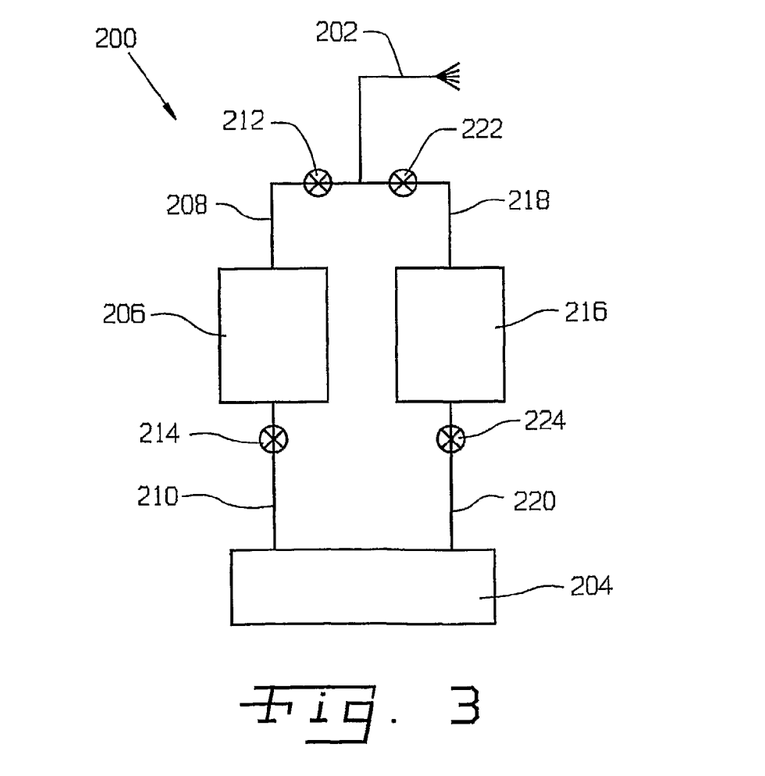
FIG. 3 is a schematic illustration of another embodiment of a coating applicator system in accordance with the present invention.

An applicator system in accordance with the present invention can provide even more rapid cycle times by having multiple reservoir manifold assemblies. FIG. 3 is a schematic illustration of an applicator system 200 having an applicator 202 and a coatings supply system 204, which can be similar to applicator 12 and coatings supply system 14 described previously. System 200 further includes a first reservoir manifold assembly 206 having a first feed conduit 208 from reservoir manifold assembly 206 to applicator 202 and a first supply conduit 210 from coatings supply system 204 to first reservoir manifold assembly 206. A first applicator isolation valve 212 is disposed in first feed conduit 208 and a first coating changer isolation valve 214 is disposed in first supply conduit 210. Assembly 206 is similar to assembly 16, and has a different reservoir therein for each different coating to be applied by system 200, each reservoir thereof connected by a different two-way valve to a header.

System 200 further includes a second reservoir manifold assembly 216 having a second feed conduit 218 from reservoir manifold assembly 216 to applicator 202 and a second supply conduit 220 from coatings supply system 204 to second reservoir manifold assembly 216. A second applicator isolation valve 222 is disposed in second feed conduit 218 and a second coating changer isolation valve 224 is disposed in second supply conduit 220. Assembly 216 is similar to assembly 16 or assembly 206, and has a different reservoir therein for each different coating to be applied by system 200, each reservoir thereof connected by a different two-way valve to a header.

Assemblies 206 and 216 each further include first and second manifold assemblies, solvent systems and dosing fluid systems similar to manifold assembly 60, solvent system 62 and dosing fluid system 64 described previously herein.

In the use of system 200, one of first assembly 206 and second assembly 216 can be used to dispense coating to applicator 202 while the other of assemblies 206 and 216 is having a reservoir therein being filled from coating supply system 204. If first assembly 206 is dispensing coating from a reservoir therein to applicator 202, first coating changer isolation valve 214 is closed, and first supply conduit 210 is clean and dry. First supply conduit 210 is thereby an isolation leg between the grounded supply system 204 and the high potential first manifold assembly 206. At the same time, second reservoir manifold assembly 216 can have a reservoir therein being filled from supply system 204. Second applicator isolation valve 222 is closed, and second feed conduit 218 is clean and dry, thereby being an isolation leg between the grounded second reservoir manifold assembly 216 and applicator 202 at high potential.

Conversely, if second assembly 216 is dispensing coating from a reservoir therein to applicator 202, second coating changer isolation valve 224 is closed, and second supply conduit 220 is clean and dry. Second supply conduit 220 is thereby an isolation leg between the grounded supply system 204 and the high potential second manifold assembly 216. At the same time, first reservoir manifold assembly 206 can have a reservoir therein being filled from supply system 204. First applicator isolation valve 212 is closed, and first feed conduit 208 is clean and dry, thereby being an isolation leg between the grounded first reservoir manifold assembly 206 and applicator 202 at high potential.

It should be understood that system 200 can be used in either operating sequence described previously. That is, system 200 can be operated with all reservoirs full in the manifold assembly 206 or 216 from which coating is being dispensed, and coating being filled to the reservoir just emptied in the other manifold assembly 206 or 216. Alternatively, system 200 can be used with coating in only the one reservoir of manifold assembly 206 or 216 from which coating is being dispensed, and coating being filled to the reservoir that will be used in the other manifold assembly 206 or 216 to coat the next object.

Figure 4:
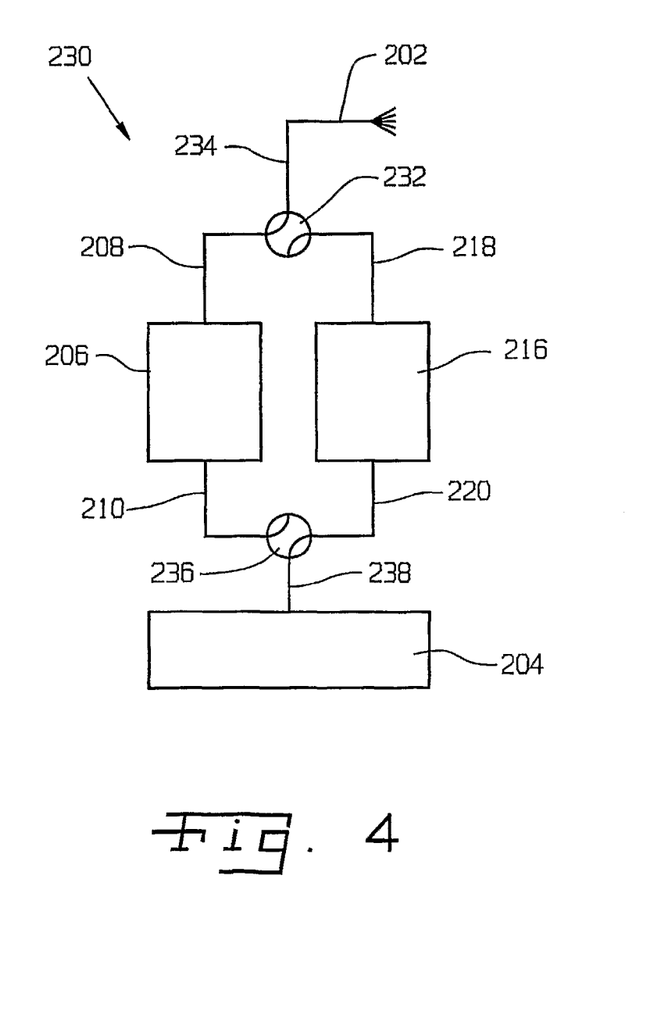
FIG. 4 is a schematic illustration of yet another embodiment of a coating applicator system in accordance with the present invention.

FIG. 4 shows yet another applicator system 230, which is similar to system 200. Components of system 230 that are similar to those of system 200 bear the same reference numerals as in system 200. In system 230, first and second applicator isolation valves 212 and 222 are combined in a first multi-outlet valve 232 which serves to connect either first or second feed conduit 208 or 218 to applicator 202 via a shared feed conduit 234. The other one of first or second feed conduit 208 or 218 that is not connected to shared feed conduit 234 is electrically isolated. A second multi-outlet valve 236 is used in place of separate first and second coating changer isolation valves 214 and 224. Second multi-outlet valve 236 connects either first or second supply conduit 210 or 220 to coating supply system 204 via a shared supply conduit 238. The other one of first or second supply conduit 210 or 220 that is not connected to shared supply conduit 238 is electrically isolated. Appropriate multi-outlet valves for this purpose provide the necessary electrical isolation for the reservoir manifold assembly 206 or 216 from which coating is being dispensed, which will be at high electrical potential.

Filling, cleaning and spraying proceed as described previously. Use of assemblies 206 and 216 alternate between dispensing for spraying and filling from supply system 204. In some uses of the present invention, it may be advantageous to provide three or more reservoir manifold assemblies in the applicator system. With use for spraying rotating through three or more reservoir manifold assemblies, after one is used, more time is available to prepare it for its next use. For example, with three reservoir manifold assemblies, one reservoir manifold assembly can be dispensing coating to the applicator while a second reservoir manifold assembly having just completed dispensing of coating is being cleaned and in early refilling procedures, and a third reservoir manifold assembly is in final refilling and cleaning procedures in preparation to be the next for dispensing coating to the applicator.

Figure 5:
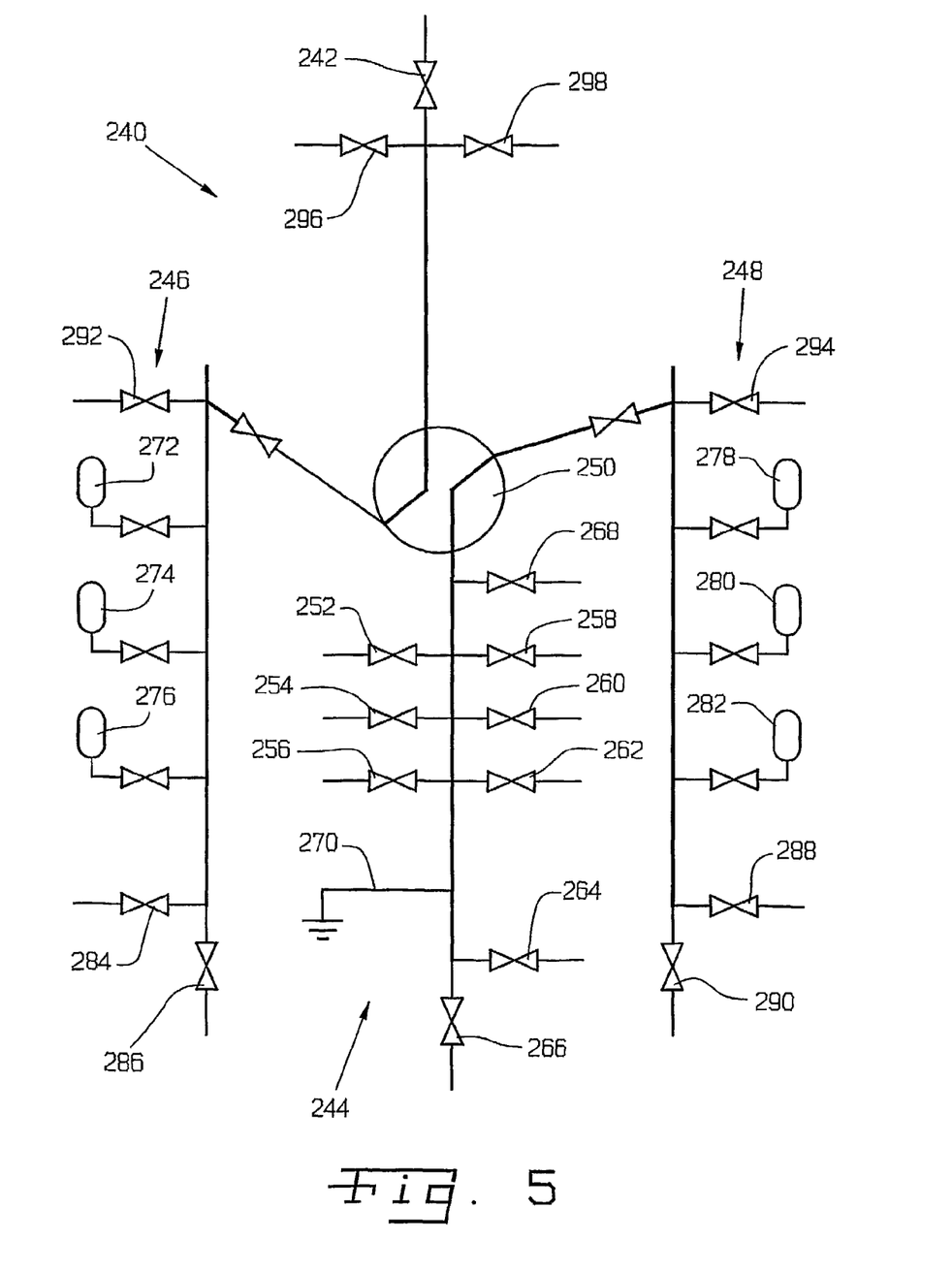
FIG. 5 is a schematic illustration of still another embodiment of a coating applicator system in accordance with the present invention.

FIG. 5 shows still another applicator system 240 having an applicator 242, a coatings supply system 244 and first and second reservoir manifold assemblies 246, 248 respectively. A four-way rotary valve 250 selectively connects first reservoir manifold assembly 246 and second reservoir manifold assembly 248 with either applicator 242 or coatings supply system 244.

Coatings supply system 244 includes coating supplies 252, 254, 256, 258, 260 and 262. A solvent connection 264, pressurized air connection 266 and dump 268 are provided for cleaning coating system supply 244 using solvent push, solvent cleaning and solvent and air chop as described previously. Coating supply system 244 is grounded at 270.

First reservoir manifold assembly 246 includes coating reservoirs 272, 274 and 276. Second reservoir manifold assembly 248 includes coating reservoirs 278, 280 and 282. Thus, first reservoir manifold assembly 246 and second reservoir manifold assembly 248 are shown having reservoirs for different coatings; however, it should be understood that one reservoir for each different coating also can be provided in each first reservoir manifold assembly 246 and second reservoir manifold assembly 248. First reservoir manifold assembly 246 includes a connection to a solvent source 284 and a connection to a pressurized air source 286. Second reservoir manifold assembly 248 includes a connection to a solvent source 288 and a connection to a pressurized air source 290. A dump connection 292 is provided for first reservoir manifold assembly 246, and a dump connection 294 is provided for second reservoir manifold assembly 248. An applicator cleaning connection 296, which may include connections to both solvent and pressurized air sources, and an applicator dump connection 298 are provided. Solvent push, solvent cleaning and solvent air chop are provided as described previously herein Operation of system 240 is similar to the operations described previously for system 10, 200 and 230. Coating is dispensed from a reservoir 272, 274, 276, 278, 280, 282 in either first reservoir manifold assembly 246 or second reservoir manifold assembly 248 while a reservoir 272, 274, 276, 278, 280, 282 in the other of first reservoir manifold assembly 246 or second reservoir manifold assembly 248 is being filled. Applicator 242 and the reservoir manifold assembly 246 or 248 from which coating is being dispensed are at high voltage. Coating supply system 244 and the reservoir manifold assembly 246 or 248 fluidly coupled to it are at ground potential. Four-way valve 250 provides the necessary electrical isolation between applicator 242, coating supply system 244, first reservoir manifold assembly 246 and second reservoir manifold assembly 248.

As illustrated in FIG. 5, first reservoir manifold assembly 246 is connected to applicator 242, and second reservoir manifold assembly 248 is connected to coating supply system 244. Coating from one of reservoirs 272, 274, 276 in first reservoir manifold assembly 246 is dispensed to applicator 242 for a first application process, while one of reservoir 278, 280, 282 in second reservoir manifold assembly 248 is being filled from coating supply system 244. After the first application is complete and the necessary cleaning is accomplished, four-way rotary valve 250 is adjusted so that the second reservoir manifold assembly 248 is connected to applicator 242 and first reservoir manifold assembly 246 is connected to coating supply system 244. Coating from one of reservoirs 278, 280, 282 in second reservoir manifold assembly 248 is dispensed to applicator 242 for a second application operation while one of reservoirs 272, 274, 278 in first reservoir manifold assembly 246 is being filled from coating supply system 244. Solvent and air push sequences, solvent/air chop cycles and the like, as described previously, can be used in system 240.

The various "conduits", "lines" and the like for transporting coating, solvent and dosing fluid throughout the applicator systems described herein advantageously are tubular bodies of substantially nonconductive material to which the fluids, including the coatings transported throughout the systems, do not adhere readily. The material desirably is highly non-reactive with the fluids moving therethrough, including the various components of the coatings, the solvent and the dosing fluid. A perfluoroalkoxy copolymer, such as PFA TEFLON® (a registered trademark of E.I. du Pont de Nemours and Company) has been used effectively for water-based paints coatings and the aforementioned solvents and dosing fluid.

During extended periods of non-use, systems 10, 200, 230 and 240 are cleaned and may be dried. Alternatively, to prevent hardening of any residual materials, the coating reservoirs, conduits and lines can be filled with solvent. At restart-up, the reservoirs, conduits and lines are purged and primed as necessary.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A reservoir manifold assembly for a coating applicator system to provide a variety of different coatings on objects, the coating applicator system having an applicator for applying the coatings and a coating supply including sources of each different coating and a coating changer selectively enabling flow from each different coating source, said manifold assembly comprising:

a plurality of coating reservoirs including a different coating reservoir for each different coating, each said coating reservoir having a variable first volume, a variable second volume and a movable barrier separating said first and second volumes;

a header in selective flow communication with the coating changer, all reservoirs of said plurality of reservoirs and the applicator;

said header being a single passageway through which all coatings flow from the coating changer to all reservoirs of said plurality of reservoirs and through which all coatings flow from all reservoirs of said plurality of reservoirs to the applicator;

a different two-way valve selectively placing each said first volume of each said reservoir in flow communication with said header, each said two-way valve being open to fill the reservoir to which it is connected with a coating from the coating changer through said header and to discharge the coating from the reservoir to the applicator through said header; and a solvent system in selective flow communication with said header.

2. The reservoir manifold assembly of claim 1, said movable barrier in each said coating reservoir being a bladder, and said reservoir manifold assembly including a dosing fluid circuit having a dosing fluid source and dosing fluid pump in flow communication with said second volumes in said coating reservoirs.

3. The reservoir manifold assembly of claim 2, said second volumes being connected in series.

4. The reservoir manifold assembly of claim 3, said solvent system including a solvent source and a solvent reservoir having a first volume in selective flow communication with said solvent source and in selective flow communication with said header.

5. The reservoir manifold assembly of claim 4, said solvent reservoir having a second volume and a movable barrier separating said first and second volumes in said solvent reservoir.

6. The reservoir manifold assembly of claim 5, said movable barrier in said solvent reservoir being a bladder, and said second volume in said solvent reservoir being in flow communication with said dosing fluid circuit.

7. The reservoir manifold assembly of claim 6, said solvent system including a source of pressurized air, and solvent and air valves selectively connecting said solvent source and said source of pressurized air to header.

8. The reservoir manifold assembly of claim 1, said solvent system including a solvent source and a solvent reservoir receiving solvent from said solvent source, said solvent reservoir having a first volume in selective flow communication with said solvent source and in selective flow communication with said header.

9. The reservoir manifold assembly of claim 8, said solvent reservoir having a second volume and a movable barrier separating said first and second volumes in said solvent reservoir.

10. The reservoir manifold assembly of claim 9, said movable barrier in said solvent reservoir being a bladder.

11. The reservoir manifold assembly of claim 1, including a dosing fluid circuit in flow communication with said second volumes of said reservoirs, and said second volumes of said reservoirs being connected in series.

12. The reservoir manifold assembly of claim 1, including a dosing fluid circuit in flow communication with said second volumes of said reservoirs, and said second volumes of said reservoirs being connected in parallel.

* * * * *